United States Patent
Dershem et al.

(10) Patent No.: US 7,863,346 B2
(45) Date of Patent: *Jan. 4, 2011

(54) MOLD COMPOSITIONS WITH HIGH ADHESION TO METAL SUBSTRATES

(75) Inventors: Stephen M. Dershem, San Diego, CA (US); Debbie Forray, San Diego, CA (US)

(73) Assignee: Designer Molecules, Inc., San Diego, CA (US)

( * ) Notice: Subject to any disclaimer, the term of this patent is extended or adjusted under 35 U.S.C. 154(b) by 933 days.

This patent is subject to a terminal disclaimer.

(21) Appl. No.: 11/348,505

(22) Filed: Feb. 7, 2006

(65) Prior Publication Data

US 2007/0299154 A1    Dec. 27, 2007

(51) Int. Cl.
*C08F 299/04*    (2006.01)
(52) U.S. Cl. .................................................... 522/104
(58) Field of Classification Search ................. 522/104
See application file for complete search history.

(56) References Cited

U.S. PATENT DOCUMENTS

| | | | | |
|---|---|---|---|---|
| 4,774,267 | A * | 9/1988 | Weintraub | 523/116 |
| 5,376,721 | A * | 12/1994 | McGarry et al. | 525/64 |
| 5,428,105 | A * | 6/1995 | McGarry et al. | 525/69 |
| 5,596,669 | A * | 1/1997 | Murphy et al. | 385/128 |
| 5,707,782 | A * | 1/1998 | Economy et al. | 430/285.1 |
| 5,880,170 | A * | 3/1999 | Imura et al. | 522/104 |
| 6,313,189 | B1 * | 11/2001 | Wenz et al. | 522/179 |
| 6,777,027 | B2 * | 8/2004 | Daly et al. | 427/180 |
| 7,285,613 | B2 * | 10/2007 | Dershem et al. | 526/285 |
| 2004/0068027 | A1 * | 4/2004 | Daly et al. | 522/111 |
| 2004/0110859 | A1 * | 6/2004 | Biro et al. | 522/100 |
| 2004/0122168 | A1 * | 6/2004 | Murray | 525/63 |
| 2005/0272888 | A1 * | 12/2005 | Dershem et al. | 526/285 |

* cited by examiner

*Primary Examiner*—Harold Y Pyon
*Assistant Examiner*—Megan McCulley
(74) *Attorney, Agent, or Firm*—The Law Office of Jane K. Babin, Professional Corporation; Jane K. Babin

(57) ABSTRACT

The invention is based on the discovery that certain well-defined crosslinkable polyester compounds are useful as components in mold compositions having increased adhesion to substrates, compared to mold compositions that do not contain the crosslinkable polyester compounds described herein.

11 Claims, No Drawings

MOLD COMPOSITIONS WITH HIGH ADHESION TO METAL SUBSTRATES

RELATED APPLICATION DATA

This application claims the benefit of priority of U.S. Provisional Application Ser. No. 60/649,243 filed Feb. 2, 2005, and U.S. Provisional Application Ser. No. 60/649,245 filed Feb. 2, 2005, the entire disclosures of which are incorporated herein by reference.

FIELD OF THE INVENTION

The present invention relates to mold compositions, methods of preparation and uses therefor. In particular, the present invention relates to mold compositions having high adhesion to a variety of substrates.

BACKGROUND OF THE INVENTION

Adhesive compositions, particularly conductive adhesives, are used for a variety of purposes in the fabrication and assembly of semiconductor packages and microelectronic devices. The more prominent uses include bonding of electronic elements such as integrated circuit chips to lead frames or other substrates, and bonding of circuit packages or assemblies to printed wire boards. Adhesives useful for electronic packaging applications typically exhibit properties such as good mechanical strength, curing properties that do not affect the component or the carrier, and thixotropic properties compatible with application to microelectronic and semiconductor components.

One class of adhesive compositions used in the production of microelectronic packages is mold compositions or overmold compositions. The primary function of mold compositions is to provide environmental protection and electrical insulation to the package. Typically, mold compositions are composed of epoxy resins, some type of filler, and a curing initiator. Although epoxy resins have utility as mold compounds, there is still a need for mold compounds with higher adhesion to metal substrates than is presently-available. The present invention addresses this need.

SUMMARY OF THE INVENTION

The invention is based on the discovery that certain well-defined crosslinkable polyester compounds are useful as components in mold compositions having increased adhesion to substrates, compared to mold compositions that do not contain the crosslinkable polyester compounds described herein. In one embodiment of the invention, there is provided a composition for molding electronic components, including at least one crosslinkable polyester compound having the structure:

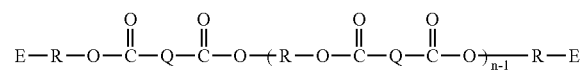

wherein:
R and Q are each independently substituted or unsubstituted aliphatic, aryl, or heteroaryl;
each E is independently a crosslinkable moiety; and
n is 1 to about 10.

In another embodiment, there are provided methods for increasing adhesion of epoxy mold compositions to substrates. Such methods can be performed, for example, by incorporating into the epoxy mold composition an effective amount of a crosslinkable polyester compound having the structure:

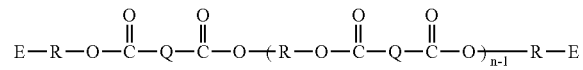

wherein:
R and Q are each independently substituted or unsubstituted aliphatic, aryl, or heteroaryl;
each E is independently a crosslinkable moiety; and
n is 1 to about 10.

DETAILED DESCRIPTION OF THE INVENTION

The invention is based on the discovery that certain well-defined crosslinkable polyester compounds are useful as components in mold compositions having increased adhesion to substrates, compared to mold compositions that do not contain the crosslinkable polyester compounds described herein. In one embodiment of the invention, there is provided a composition for molding electronic components, including at least one crosslinkable polyester compound having the structure:

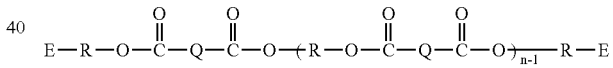

wherein:
R and Q are each independently substituted or unsubstituted aliphatic, aryl, or heteroaryl;
each E is independently a crosslinkable moiety; and
n is 1 to about 10.

As used herein, "aliphatic" refers to any alkyl, alkenyl, or cycloalkyl moiety.

As used herein, "alkyl" refers to straight or branched chain hydrocarbyl groups having from 1 up to about 100 carbon atoms. "Substituted alkyl" refers to alkyl moieties bearing substituents including alkyl, alkenyl, alkynyl, hydroxy, oxo, alkoxy, mercapto, cycloalkyl, substituted cycloalkyl, heterocyclic, substituted heterocyclic, aryl, substituted aryl, heteroaryl, substituted heteroaryl, aryloxy, substituted aryloxy, halogen, haloalkyl, cyano, nitro, nitrone, amino, amido, —C(O)H, —C(O)—, —S—, —S(O)$_2$—, —OC(O)—O—, —NR—C(O)—, —NR—C(O)—NR—, —OC(O)—NR—, wherein R is H or lower alkyl, acyl, oxyacyl, carboxyl, carbamate, sulfonyl, sulfonamide, sulfuryl, and the like.

As used herein, "cycloalkyl" refers to cyclic ring-containing groups containing in the range of about 5 up to about 20 carbon atoms, and "substituted cycloalkyl" refers to cycloalkyl groups further bearing one or more substituents as set forth above. In some embodiments, the cycloalkyl refers to cyclic ring-containing groups containing in the range of about 5 up to about 12 carbon atoms As used herein, "aryl" refers to aromatic groups having in the range of 6 up to 14 carbon atoms and "substituted aryl" refers to aryl groups further bearing one or more substituents as set forth above.

As used herein, "heterocyclic" refers to cyclic (i.e., ring-containing) groups containing one or more heteroatoms (e.g., N, O, S, or the like) as part of the ring structure, and having in the range of 3 up to 14 carbon atoms and "substituted heterocyclic" refers to heterocyclic groups further bearing one or more substituents as set forth above. The term "heterocyclic" is also intended to refer to heteroaryl moieties.

As used herein, "alkenyl" refers to straight or branched chain hydrocarbyl groups having at least one carbon-carbon double bond, and having in the range of about 2 up to 100 carbon atoms, and "substituted alkenyl" refers to alkenyl groups further bearing one or more substituents as set forth above.

As used herein, the term "crosslinkable" refers to any moiety that had the ability to crosslink with another moiety. As used herein, the term "crosslink" refers to the attachment of two or more polymer chains by bridges of an element, a molecular moiety, or a compound. In general, crosslinking of the compounds of the invention takes place upon heating. As cross-linking density is increased, the properties of a material can be changed from thermoplastic to thermosetting.

In certain embodiments, R is a substituted or unsubstituted cycloalkyl having from 5 to about 20 carbon atoms. In other embodiments, R is a substituted or unsubstituted cycloalkyl having from 5 to about 12 carbon atoms. In some embodiments, R is a substituted or unsubstituted cyclopentyl, cyclohexyl, norbornyl, tetracyclododecyl, or dicyclopentadienyl.

In some embodiments, R is a substituted or unsubstituted aliphatic. In some embodiments, R is $C_5$ to about $C_{500}$ aliphatic. In other embodiments, R is $C_5$ to about $C_{250}$ aliphatic. In still other embodiments, R is $C_5$ to about $C_{100}$ aliphatic. In some embodiments, R is $C_5$ to about $C_{50}$ aliphatic. In still further embodiments, R is $C_{36}$ aliphatic.

A wide variety of aryl and heteroaryl moieties are contemplated for Q in the practice of the invention. In some embodiments, Q is a substituted or unsubstituted aryl or heteroaryl having from 6 to about 14 carbon atoms. In other embodiments, Q is a substituted or unsubstituted phenyl or naphthyl. In further embodiments, Q is a substituted or unsubstituted cycloalkyl, such as, for example, norbornyl.

In some embodiments, Q is a substituted or unsubstituted aliphatic. In some embodiments, Q is $C_5$ to about $C_{500}$ aliphatic. In other embodiments, Q is $C_5$ to about $C_{250}$ aliphatic. In still other embodiments, Q is $C_5$ to about $C_{100}$ aliphatic. In some embodiments, Q is $C_5$ to about $C_{50}$ aliphatic. In still further embodiments, Q is $C_{36}$ aliphatic.

A wide variety of crosslinkable moieties E are contemplated for use in the practice of the invention. In certain embodiments, each E is independently a free-radical crosslinking moiety, such as, for example, acrylate, methacrylate, maleimide, styrenic, vinyl ester, olefin, allyl, vinyl ether, itaconate, fumarate, and the like.

In other embodiments, each E is independently a ring-opening crosslinking moiety, such as, for example, epoxy, oxetane, oxazoline, benzoxazine, and the like.

In some embodiments, each E is independently a ring-closing crosslinking moiety, such as, for example, cyanate ester, propargyl ether, and the like.

In certain embodiments of the invention, the crosslinkable polyester compounds of the invention include is acrylate and/or methacrylate crosslinking moieties. Some exemplary compounds are set forth below:

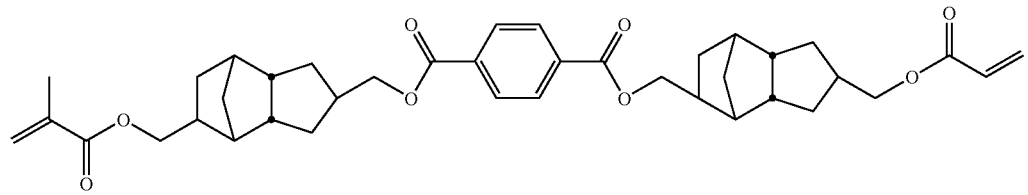

Compound 1

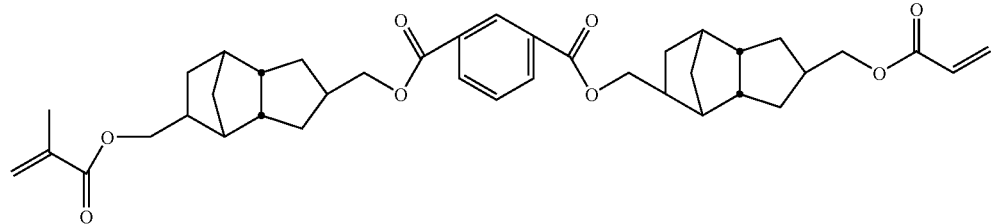

Compound 2

Compound 3
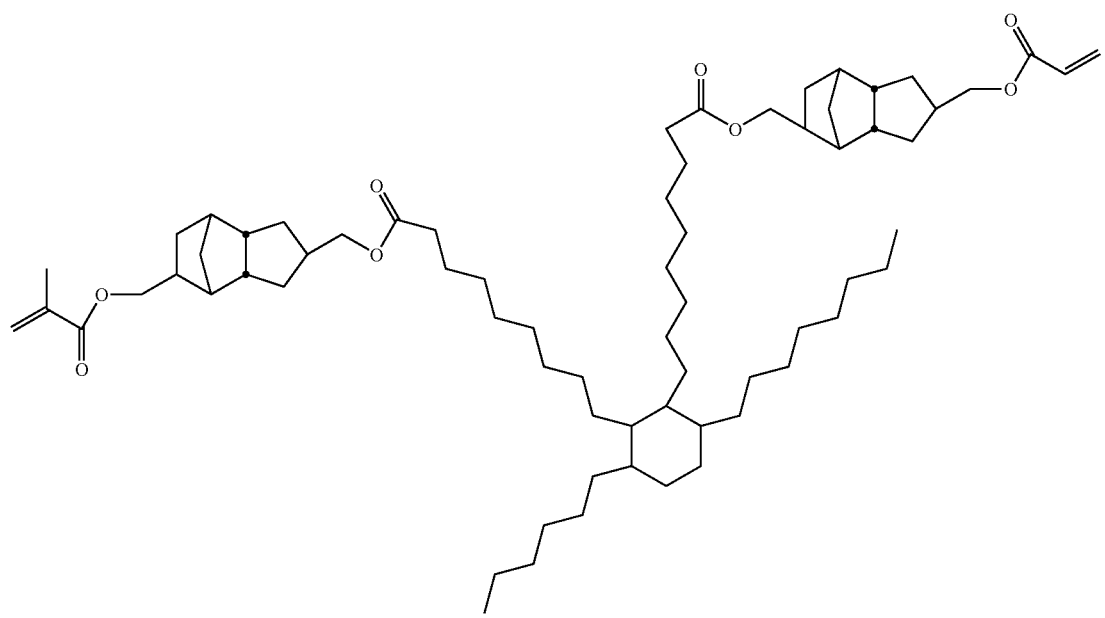
Compound 4
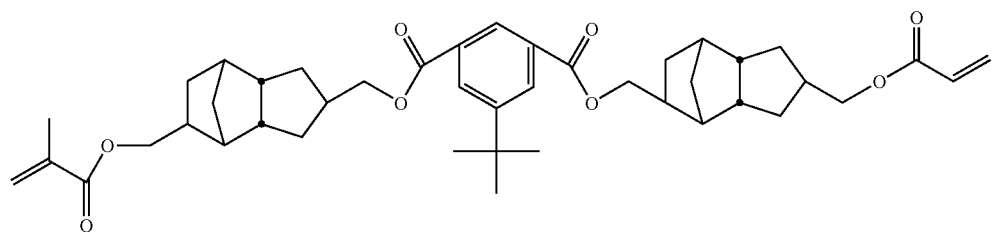
Compound 5
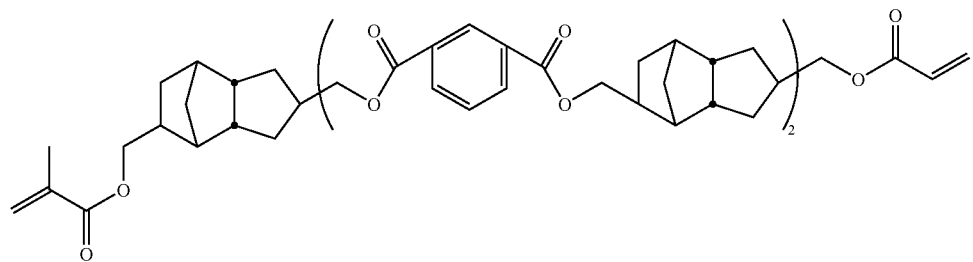

-continued
Compound 6
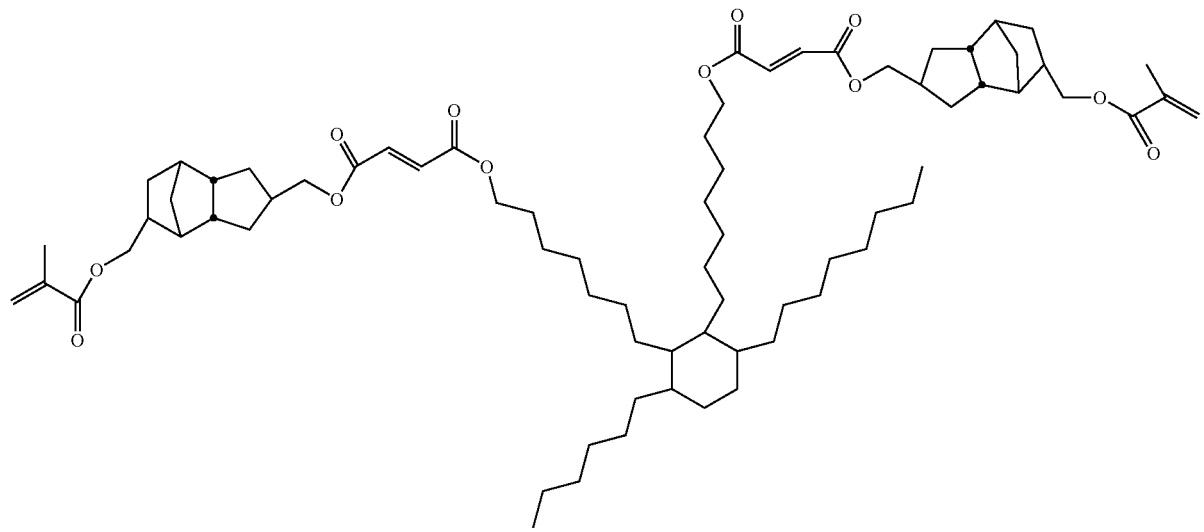
Compound 7
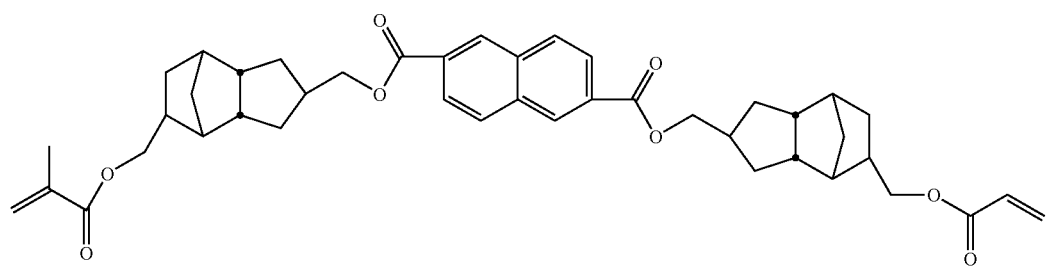
Compound 8
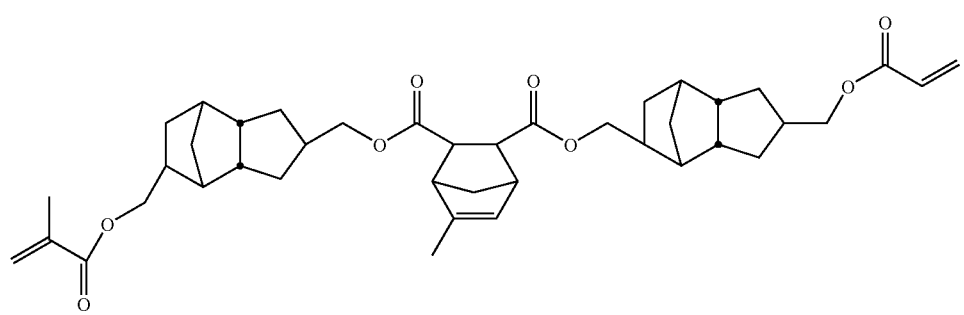
Compound 9
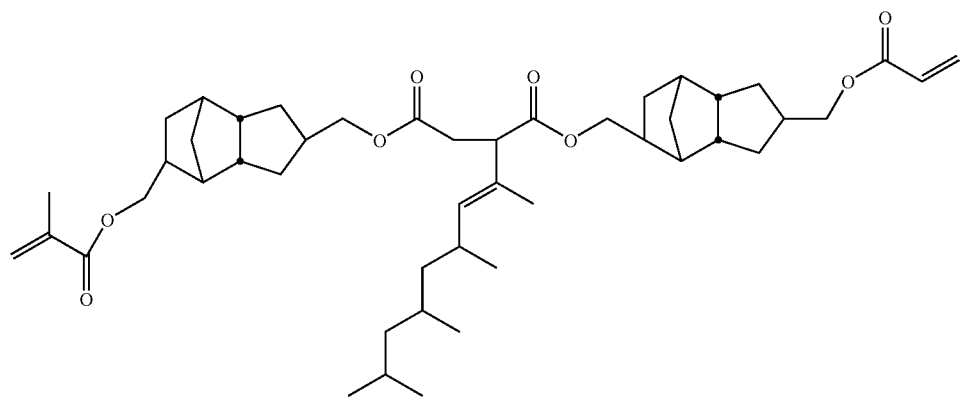

-continued
Compound 10
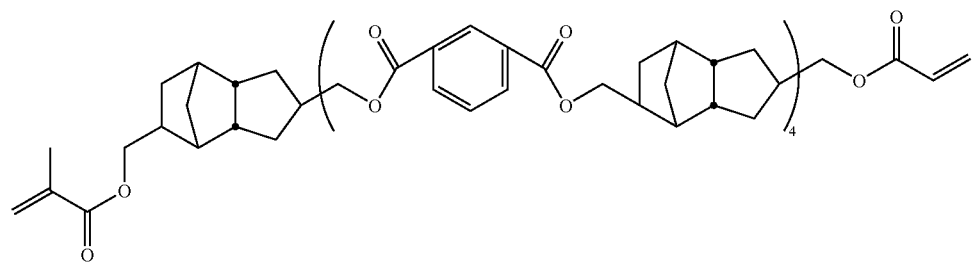
Compound 11
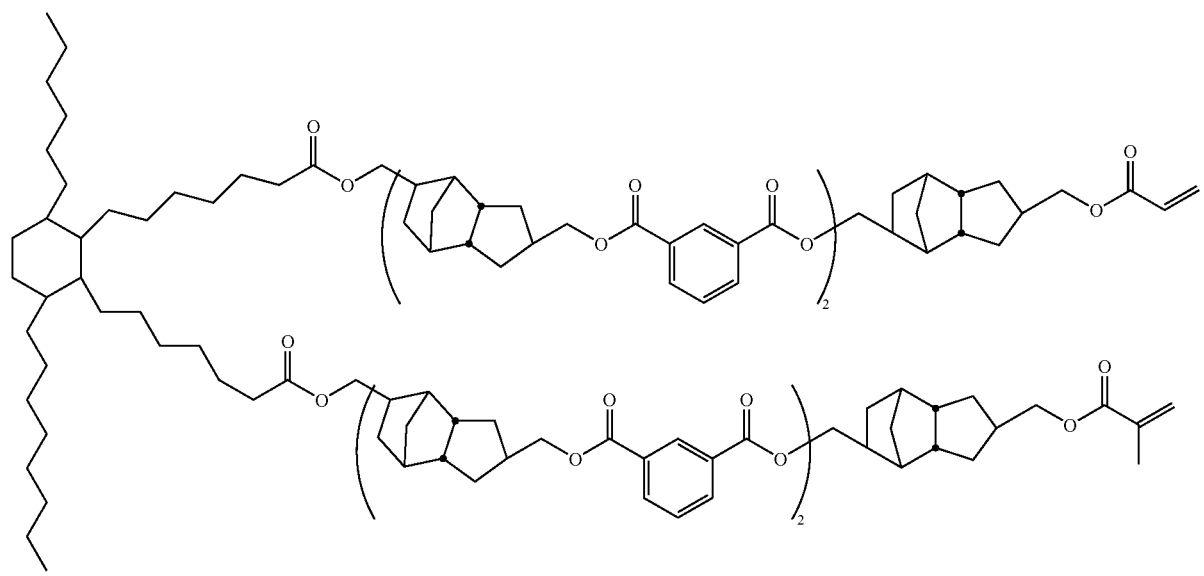
Compound 12
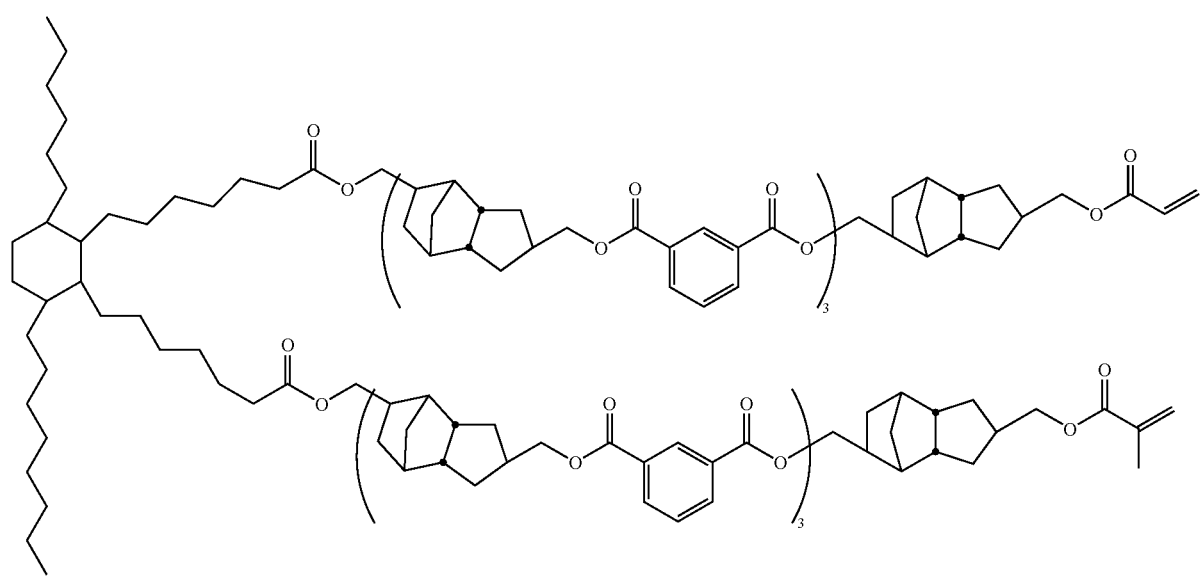
Compound 13
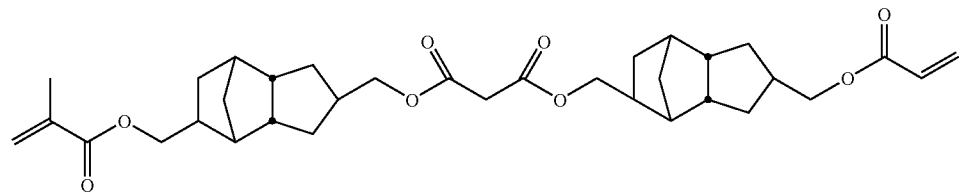

-continued
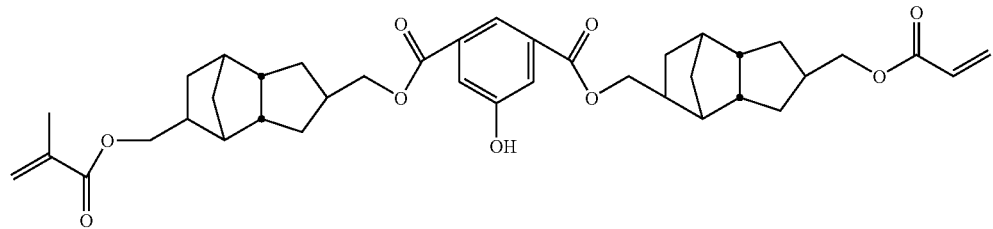
Compound 14
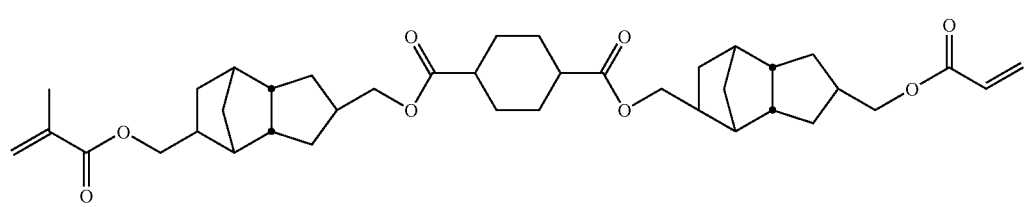
Compound 15
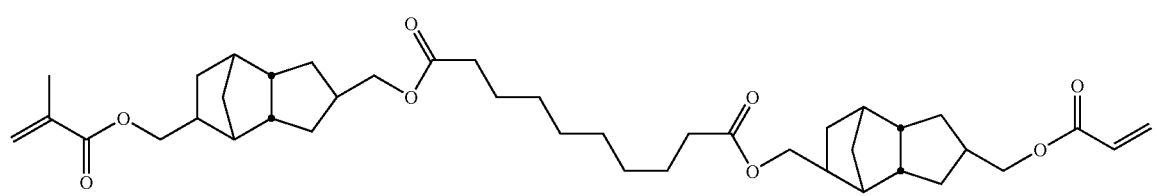
Compound 16
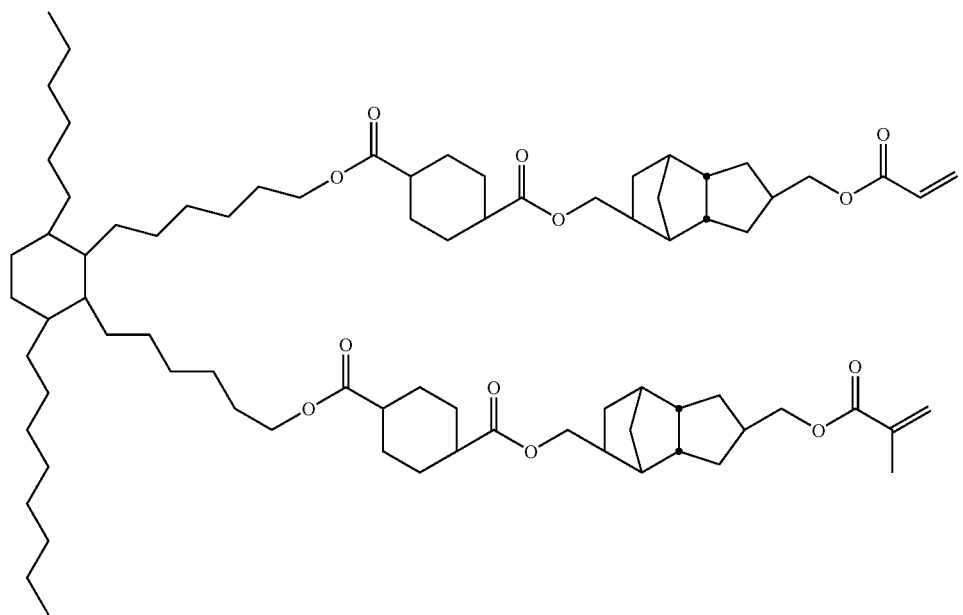
Compound 17

-continued
Compound 18
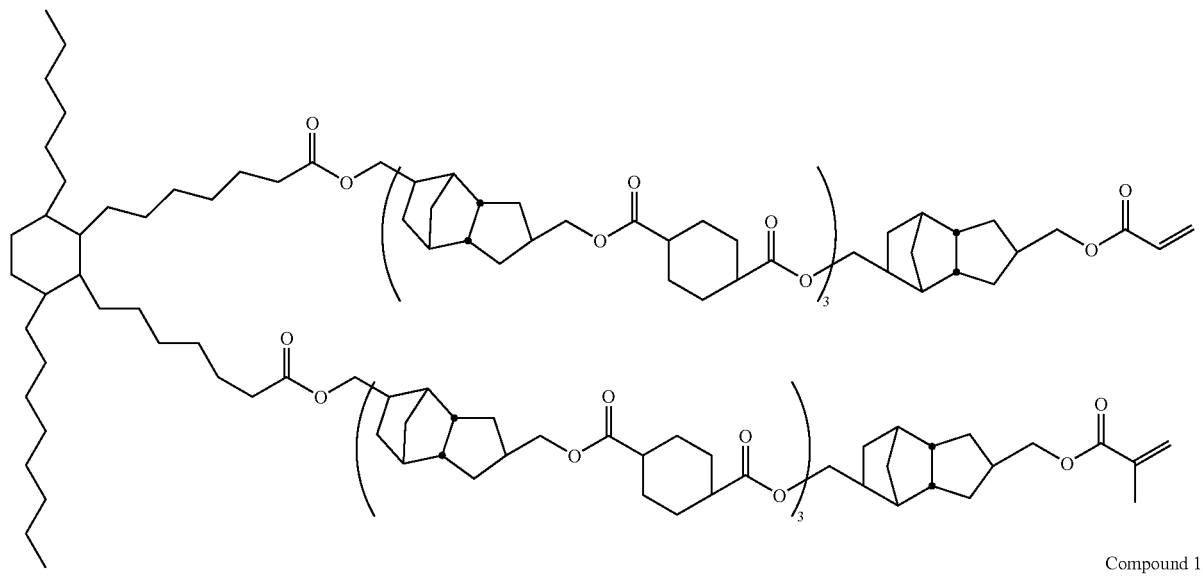
Compound 19
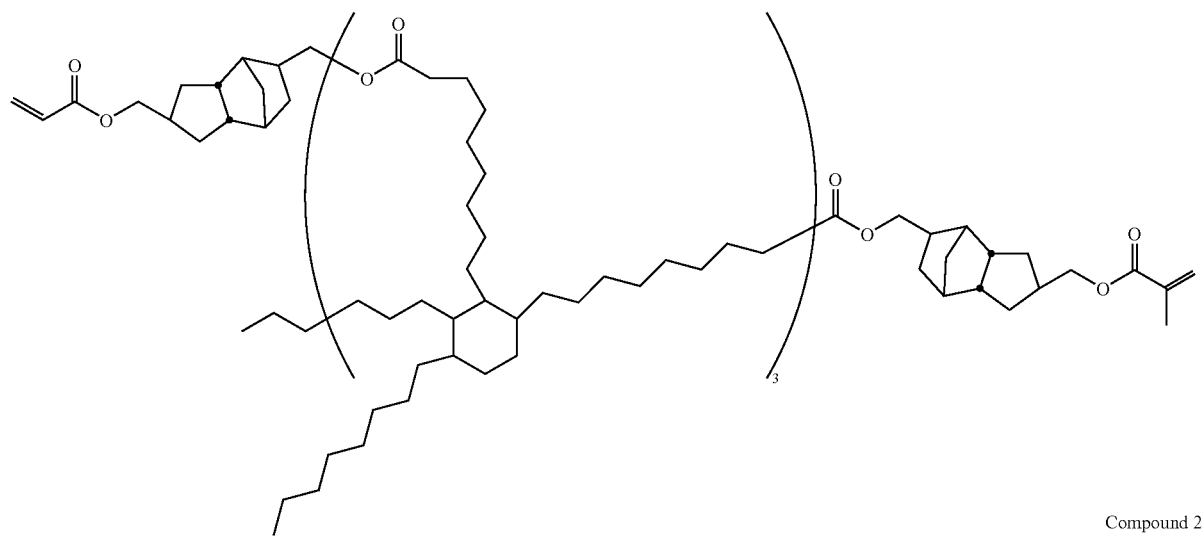
Compound 20
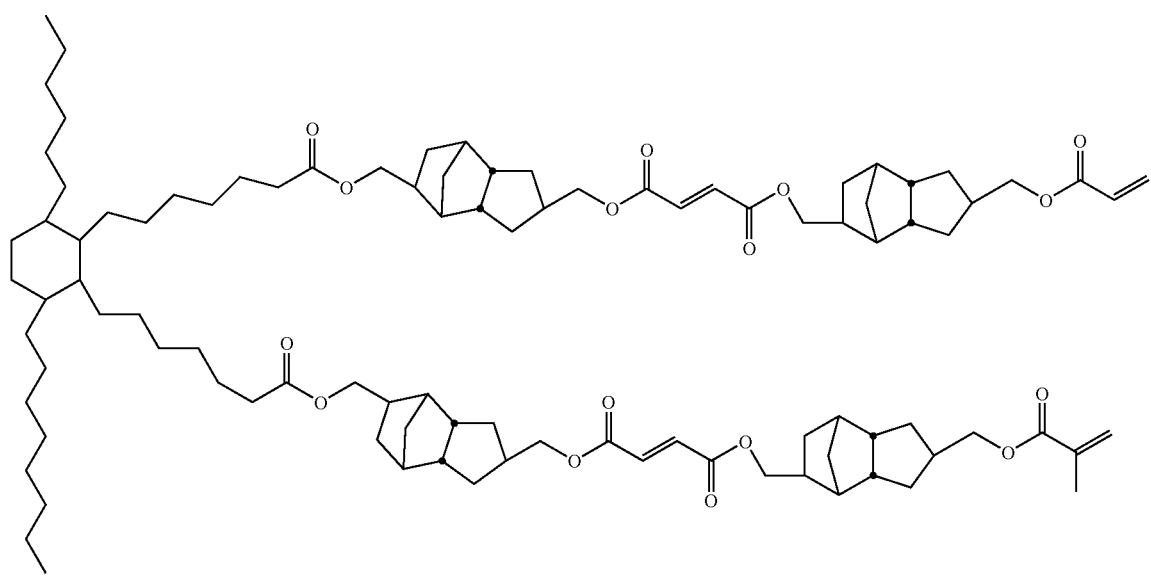

Further exemplary compounds containing other crosslinkable moieties are set forth below:
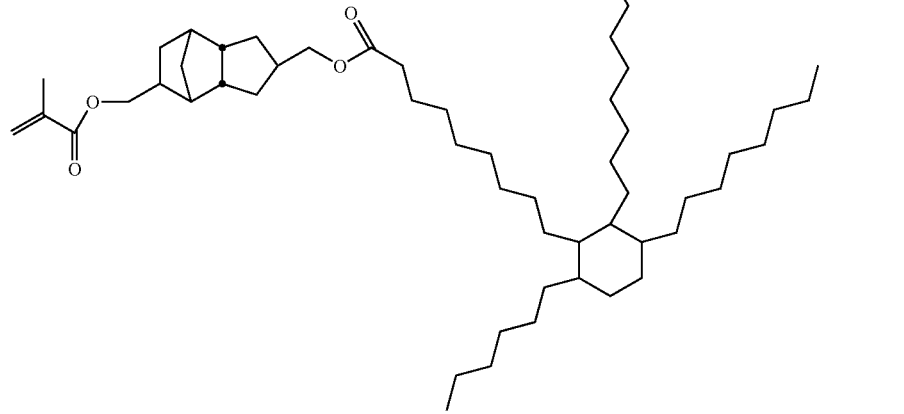
Compound 21
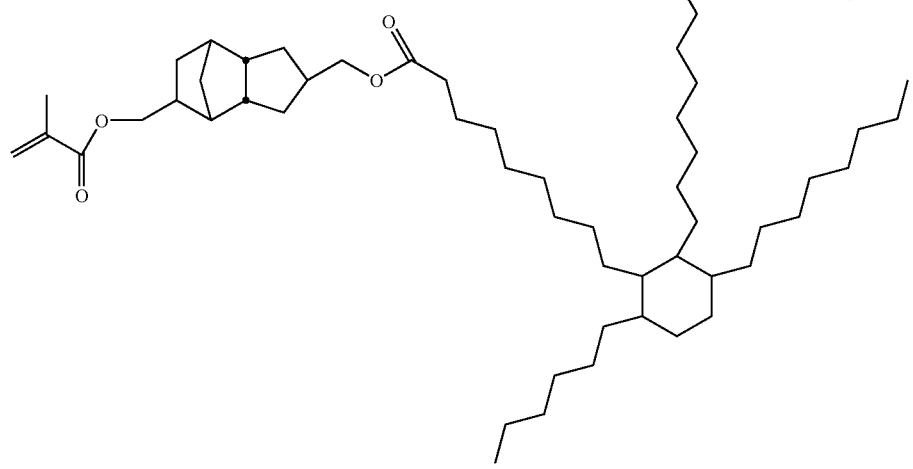
Compound 22
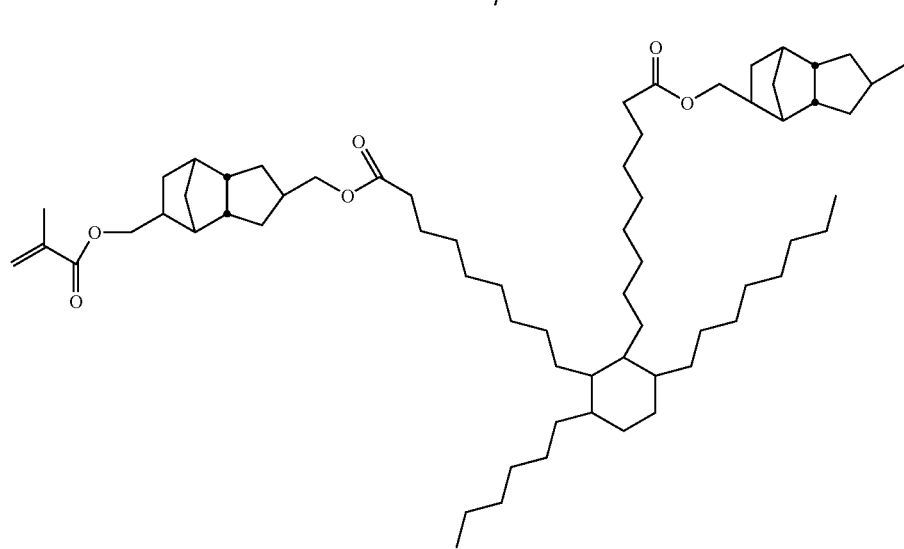
Compound 23

The compounds of the invention are readily prepared according to organic chemistry techniques well-known to those skilled in the art. For example, the esters and described herein are typically prepared by condensation of the appropriate acid and alcohols to the corresponding ester under acid catalysis; or alternatively, the compounds are prepared via transesterification under acid or base catalysis. Another synthetic route to the compounds described herein is a condensation reaction of the appropriate alcohols and acid chlorides in the presence of a tertiary amine.

In some embodiments of the invention, the crosslinkable polyester compounds are combined with at least one epoxy resin to produce an invention mold composition. Exemplary epoxy resins contemplated for use in the practice of the invention include N,N-diglycidyl aniline, N,N-diglycidyl-4-glycidyloxyaniline, diglycidyl 1,2-cyclohexanedicarboxylate, diglycidyl 1,2,3,4-tetrahydrophthalate, bis(4-glycidyloxyphenyl)methane, 4,4'-isopropylidenediphenol diglycidyl ether, resorcinol diglycidyl ether, substituted-biphenyl diglycidyl ethers, substituted naphthalene diglycidyl ethers, and the like, as well as suitable combinations of any two or more thereof.

Further examples of epoxy resins include glycidyl ethers of compounds selected from phenols, cresol formaldehyde, polyhydroxy phenols, polyaromatic phenols, aliphatic alcohols, polyglycols, aromatic amines, and the like, as well as suitable combinations of any two or more thereof.

Exemplary glycidyl ethers of phenols suitable for use as epoxy resins include phenyl glycidyl ethers, cresyl glycidyl ethers, nonylphenyl glycidyl ethers, and p-tert-butylphenyl glycidyl ethers, and the like, as well as suitable combinations of any two or more thereof. Exemplary glycidyl ethers of phenols also include diglycidyl ethers of: bisphenols (e.g., bisphenol A, bisphenol F, bisphenol E, bisphenol M, bisphenol P, and the like), ethylidenebisphenol, dihydroxydiphenyl ether, N,N'-disalicylal-ethylenediamine, bis(4-hydroxyphenyl)sulfone, bis(hydroxyphenyl)sulfide, 1,1-bis(hydroxyphenyl)cyclohexane, 9,19-bis(4-hydroxyphenyl)fluorene, 1,1,1-tris(hydroxyphenyl)ethane, trihydroxytritylmethane, 4,4'-(1-alpha-methylbenzylidene)bisphenol, 4,4'-(1,3-diethylethylene)diphenol, diethylstilbesterol, 4,4'-dihyroxybenzophenone, resorcinol, catechol, tetrahydroxydiphenyl sulfide, and the like, as well as suitable combinations of any two or more thereof.

Exemplary glycidyl ethers of fused ring polyaromatic phenols suitable for use as epoxy compound starting materials include glycidyl ethers of: dihydroxy naphthalene, 2,2'-dihydroxy-6,6'-dinaphthyl disulfide, 1,8,9-trihydroxyanthracene, and the like, as well as suitable combinations of any two or more thereof.

Exemplary glycidyl ethers of aliphatic alcohols suitable for use as epoxy compound starting materials include diglycidyl ethers of 1,4 butanediol, diglycidyl ethers of neopentyl glycol, diglycidyl ethers of cyclohexane dimethanol, trimethyol ethane triglycidyl ethers, trimethyol propane triglycidyl ethers, and the like, as well as suitable combinations of any two or more thereof.

In other embodiments, the mold composition contains epoxy diluents. Epoxy diluents contemplated for use in the practice of the present invention include liquid diluents which comprise at least one epoxy group and which have a viscosity which is sufficiently low to permit the liquid diluent to function as a viscosity reducer in a formulation useful as an mold for microelectronic devices. Epoxy diluents include liquid diluents which are capable of cross linking (i.e., homo- or hetero-polymerizing) in a formulation useful as an mold for microelectronic devices. Epoxy diluents can have a variety of epoxy equivalent weights (EEW), including EEWs in the range from about 45 to about 250, in a preferred range from about 90 to about 250, or in a presently preferred range from about 100 to about 200. Exemplary epoxy diluents contemplated for use in the practice of the present invention include liquid diluents having in the range of about 1 to about 3 glycidyl groups, with a preferred range of about 1 to about 2 glycidyl groups.

Further examples of epoxy diluents include 1,4-butanediol diglycidyl ether; neopentyl glycol diglycidyl ether; 1,2-epoxy-3-phenoxypropane; benzyl glycidyl ether; glycidyl isopropyl ether; glycidyl isobutyl ether; glycidyl methyl ether; glycidyl 2-methylphenyl ether; glycidyl 4-methoxyphenyl ether; glycidyl 4-nonylphenyl ether; 1,4-cyclohexanedimethanol diglycidyl ether; 4-tert-butylphenyl glycidyl ether; butyl glycidyl ether; tert-butyl glycidyl ether; trimethylolpropane triglycidyl ether; allyl glycidyl ether; and the like; as well as suitable combinations of any two or more thereof.

Epoxy compounds contemplated for use in the practice of the invention also include cycloaliphatic epoxies, such as, for example, cycloaliphatic epoxies derived from oligomers of cyclopentadiene.

In some embodiments, the at least one crosslinkable polyester compound is present in the mold composition from 1 weight percent to about 99 weight percent (wt %) based on total weight of the composition. In other embodiments, the crosslinkable polyester compound is present in the mold composition from 10 weight percent to about 90 wt %. In other embodiments, the crosslinkable polyester compound is present in the mold composition from 25 weight percent to about 75 wt %. In still other embodiments, the crosslinkable polyester compound is present in the mold composition from 40 weight percent to about 60 wt %. In other embodiments, there is at least one co-monomer typically present in the composition from 10 wt % to about 90 wt % based on total weight of the composition. Such comonomers include, for example, acrylates, methacrylates, maleimides, vinyl ethers, vinyl esters, styrenic compounds, allyl functional compounds, and the like;

There is typically at least one curing initiator present in the composition. One curing initiator is usually an amine compound which is used to cure the epoxy resin. Curing initiators for epoxy resins are well known to those skilled in the art. The at least one curing initiator is typically present in the composition from 0.1 wt % to about 5 wt % based on total weight of the composition. If the crosslinkable polyester compound contains free-radically crosslinkable moieties, a free-radical initiator is typically used to cure the composition. As used herein, the term "free radical initiator" refers to any chemical species which, upon exposure to sufficient energy (e.g., light, heat, or the like), decomposes into two parts which are uncharged, but which each possess at least one unpaired electron. Preferred free radical initiators contemplated for use in the practice of the present invention are compounds which decompose (i.e., have a half life in the range of about 10 hours) at temperatures in the range of about 70° C. up to 180° C. Exemplary free radical initiators contemplated for use in the practice of the present invention include peroxides (e.g., dicumyl peroxide, dibenzoyl peroxide, 2-butanone peroxide, tert-butyl perbenzoate, di-tert-butyl peroxide, 2,5-bis(tert-butylperoxy)-2,5-dimethylhexane, bis(tert-butyl peroxyisopropyl)benzene, and tert-butyl hydroperoxide), and the like.

The term "free radical initiator" also includes photoinitiators. For example, for invention adhesive compositions that contain a photoinitiator, the curing process can be initiated by UV radiation. In one embodiment, the photoinitiator is present at a concentration of 0.1 wt % to 5 wt % based on the total weight of the organic compounds in the composition (excluding any filler). In a one embodiment, the photoinitiator comprises 0.1 wt % to 3.0 wt %, based on the total weight of the organic compounds in the composition. Photoinitiators include benzoin derivatives, benzilketals, α,α-dialkoxyacetophenones, α-hydroxyalkylphenones, α-aminoalkylphenones, acylphosphine oxides, titanocene compounds, combinations of benzophenones and amines or Michler's ketone, and the like.

A wide variety of fillers is contemplated for use in the practice of the present invention. In some embodiments, the fillers act primarily to modify the rheology of the resulting composition. The fillers may optionally be thermally conductive. Examples of suitable fillers which can be employed in the practice of the present invention include aluminum nitride, silicon carbide, boron nitride, diamond dust, alumina, and the like. Compounds which act primarily to modify rheology include polysiloxanes (such as polydimethyl siloxanes) silica, calcium carbonate, fumed silica, alumina, titania, and the like.

As used herein, the term "coupling agent" refers to chemical species that are capable of bonding to a mineral surface and which also contain polymerizably reactive functional group(s) so as to enable interaction with the adhesive composition. Coupling agents thus facilitate linkage of the mold to the substrate to which it is applied.

Exemplary coupling agents contemplated for use in the practice of the present invention include silicate esters, metal acrylate salts (e.g., aluminum methacrylate), titanates (e.g., titanium methacryloxyethylacetoacetate triisopropoxide), or compounds that contain a copolymerizable group and a chelating ligand (e.g., phosphine, mercaptan, acetoacetate, and the like). In some embodiments, the coupling agents contain both a co-polymerizable function (e.g., vinyl moiety, acrylate moiety, methacrylate moiety, and the like), as well as a silicate ester function. The silicate ester portion of the coupling agent is capable of condensing with metal hydroxides present on the mineral surface of substrate, while the co-polymerizable function is capable of co-polymerizing with the other reactive components of invention molds. In certain embodiments coupling agents contemplated for use in the practice of the invention are oligomeric silicate coupling agents such as poly(methoxyvinylsiloxane).

In some embodiments, both photoinitiation and thermal initiation may be desirable. For example, curing of a photoinitiator-containing adhesive can be started by UV irradiation, and in a later processing step, curing can be completed by the application of heat to accomplish a free-radical cure. Both UV and thermal initiators may therefore be added to the adhesive composition.

In general, these mold compositions will cure within a temperature range of 80-220° C., and curing will be effected within a length of time of less than 1 minute to 60 minutes. As will be understood by those skilled in the art, the time and temperature curing profile for each encapsulant composition will vary, and different compositions can be designed to provide the curing profile that will be suited to the particular industrial manufacturing process. In some embodiments, a post mold bake at about 175° C. is used as a final curing step.

In certain embodiments, the mold compositions may contain compounds that lend additional flexibility and toughness to the resultant cured adhesive. Such compounds may be any thermoset or thermoplastic material having a $T_g$ of 50° C. or less, and typically will be a polymeric material characterized by free rotation about the chemical bonds, the presence of ether groups, and the absence of ring structures. Suitable such modifiers include polyacrylates, poly(butadiene), polyTHF (polymerized tetrahydrofuran, also known as poly(1,4-butanediol)), CTBN (carboxy-terminated butadiene-acrylonitrile) rubber, and polypropylene glycol.

Inhibitors for free-radial cure may also be added to the mold compositions described herein to extend the useful shelf life of compositions containing the crosslinkable polyester compounds described herein. Examples of these inhibitors include hindered phenols such as 2,6-di-tert-butyl-4-methylphenol; 2,6-di-tert-butyl-4-methoxyphenol; tert-butyl hydroquinone; tetrakis(methylene(3,5-di-tert-butyl-4-hydroxyhydrocinnamate))benzene; 2,2'-methylenebis(6-tert-butyl-p-cresol); and 1,3,5-trimethyl-2,4,6-tris(3',5'-di-tert-butyl-4-hydroxybenzyl)benzene. Other useful hydrogen-donating antioxidants include derivatives of p-phenylenediamine and diphenylamine. It is also well know in the art that hydrogen-donating antioxidants may be synergistically combined with quinones, and metal deactivators to make a very efficient inhibitor package. Examples of suitable quinones include benzoquinone, 2-tert butyl-1,4-benzoquinone; 2-phenyl-1,4-benzoquinone; naphthoquinone, and 2,5-dichloro-1,4-benzoquinone. Examples of metal deactivators include N,N'-bis (3,5-di-tert-butyl-4-hydroxyhydrocinnamoyl)hydrazine; oxalyl bis(benzylidenehydrazide); and N-phenyl-N'-(4-toluenesulfonyl)-p-phenylenediamine. Nitroxyl radical compounds such as TEMPO (2,2,6,6-tetramethyl-1-piperidnyloxy, free radical) are also effective as inhibitors at low concentrations. The total amount of antioxidant plus synergists typically falls in the range of 100 to 2000 ppm relative to the weight of total base resin. Other additives, such as adhesion promoters, in types and amounts known in the art, may also be added.

In another embodiment, there are provided methods for increasing adhesion of epoxy mold compositions to substrates. Such methods can be performed, for example, by incorporating into the epoxy mold composition an effective amount of a crosslinkable polyester compound having the structure:

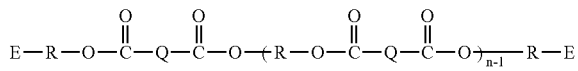

wherein:
R and Q are each independently substituted or unsubstituted aliphatic, aryl, or heteroaryl;
each E is independently a crosslinkable moiety; and
n is 1 to about 10.

In some embodiments, the substrate is metal, such as, for example, copper, alloy 42, Ag-plated copper, and the like. In other embodiments, the substrate is Ni-plated copper, Pd-plated copper, Au-plated copper, Ni—Pd—Au-plated copper, and the like. In other embodiments, the substrate includes nickel, palladium, and gold.

In some embodiments, the substrate is organic, such as for example, polyamide, FR4, bismaleimide-triazine (BT), BT-glass, and the like.

It is understood that using the compounds and methods of the present invention, it is possible to prepare mold compositions having a wide range of cross-link density by the judicious choice and amount of crosslinkable polyester compound. The greater proportion of polyfunctional compounds reacted, the greater the cross-link density. If thermoplastic properties are desired, the mold compositions can be prepared from (or at least contain a higher percentage of) mono-functional compounds to limit the cross-link density. A minor amount of poly-functional compounds can be added to provide some cross-linking and strength to the composition, provided the amount of poly-functional compounds is limited to an amount that does not diminish the desired thermoplastic properties. Within these parameters, the strength and elasticity of individual mold compositions can be tailored to a particular end-use application.

Example

The following describes an exemplary synthesis of a polyester linked acrylate or methacrylate according to the invention.

Snthesis of Compound 1

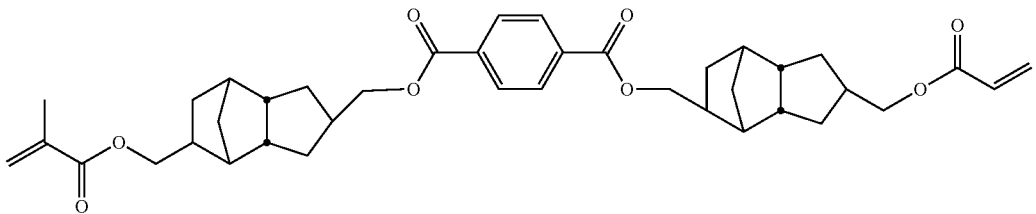

To a 500 mL round bottomed flask was added isophthalic acid (8.31 g, 50 mmol), dicyclopentadiene-dimethanol (23.6 g, 120 mmol), toluene (110 g), and methane sulfonic acid (3.5 g). This mixture was refluxed for 1.5 hours, at which time 2.0 mL of water was collected in a Dean-Stark trap. Next, acrylic acid (7.23 g, 100 mmol) and methacrylic acid (8.62 g, 100 mmol) and an additional 200 mL of toluene were added to the reaction flask. This mixture was refluxed for 2.5 hours, at which time 2.3 mL water had collected in the Dean-Stark trap. This material was then worked up with $NaHCO_3$ (25 g) and 3.5 g water followed by 21 g $MgSO_4$. Once all gas evolution had ceased, the solution was passed through silica gel and the toluene was removed by rotary evaporation, affording the product (I) (36.61 g, 95% yield).

Example 2

Synthesis of Compound 2

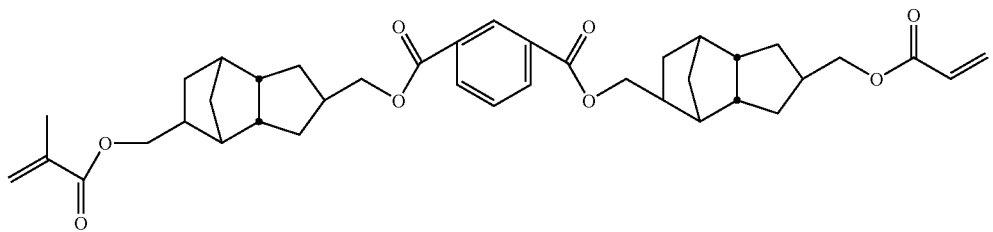

To a 500 mL round bottomed flask was added isophthalic acid (8.31 g, 50 mmol), dicyclopentadiene-dimethanol (23.6 g, 120 mmol), toluene (110 g), and methane sulfonic acid (3.5 g). This mixture was refluxed for 1.5 hours, at which time 2.0 mL of water was collected in a Dean-Stark trap. Next, acrylic acid (7.23 g, 100 mmol) and methacrylic acid (8.62 g, 100 mmol) and an additional 200 mL of toluene were added to the reaction flask. This mixture was refluxed for 2.5 hours, at which time 2.3 mL water had collected in the Dean-Stark trap. This material was then worked up with $NaHCO_3$ (25 g) and 3.5 g water followed by 21 g $MgSO_4$. Once all gas evolution had ceased, the solution was passed through silica gel and the toluene was removed by rotary evaporation, affording the product (Compound 2) (36.6 g, 95% yield).

Example 3

Synthesis of Compound 3

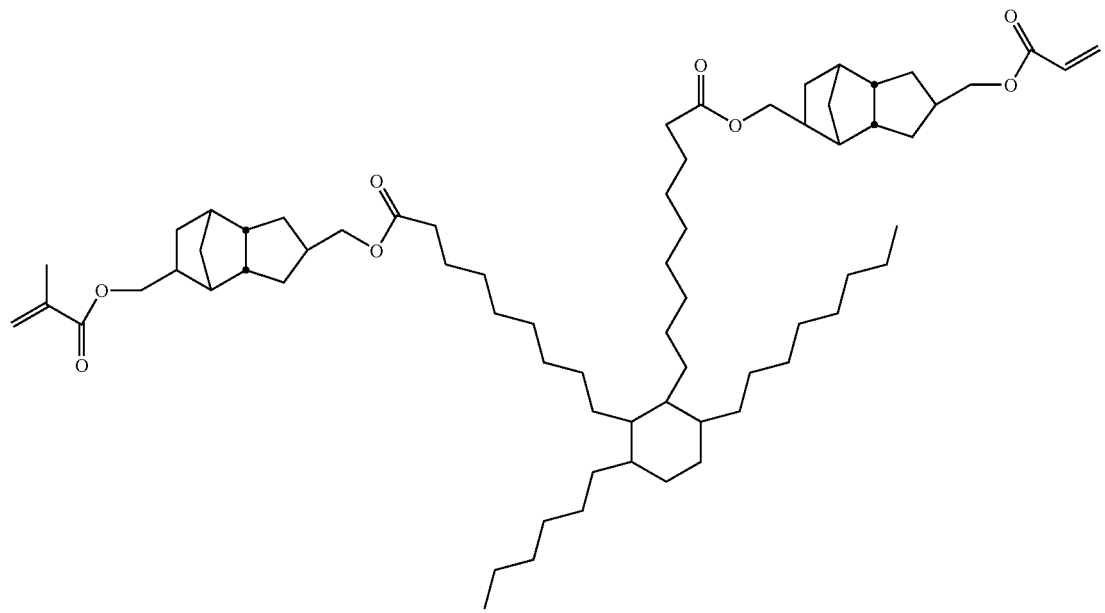

To a 500 mL round bottomed flask was added the dimmer acid Cognis Empol 1008 (28.27 g, 50 mmol), dicyclopentadiene-dimethanol (23.6 g, 120 mmol), toluene (110 g), and methane sulfonic acid (3.5 g). This mixture was refluxed for 0.5 hours, at which time 2.0 mL of water was collected in a Dean-Stark trap. Next, acrylic acid (7.23 g, 100 mmol) and methacrylic acid (8.62 g, 100 mmol) and an additional 200 mL of toluene were added to the reaction flask. This mixture was refluxed for 2.5 hours, at which time 2.1 mL water had collected in the Dean-Stark trap. This material was then worked up with NaHCO$_3$ (25 g) and 3.5 g water followed by 21 g MgSO$_4$. Once all gas evolution had ceased, the solution was passed through silica gel and the toluene was removed by rotary evaporation, affording the product (Compound 3) (54.6 g, 93% yield).

Example 4

To a 500 mL round bottomed flask was added 5-t-butyl-isophthalic acid (11.2 g, 50 mmol), dicyclopentadiene-dimethanol (23.6 g, 120 mmol), toluene (110 g), and methane sulfonic acid (1.0 g). This mixture was refluxed for 2 hours, at which time 1.8 mL of water was collected in a Dean-Stark trap. Next, acrylic acid (7.23 g, 100 mmol), methacrylic acid (8.62 g, 100 mmol), methane sulfonic acid (1.5 g), and an additional 120 mL of toluene were added to the reaction flask. This mixture was refluxed for 2.5 hours, at which time 2.3 mL water had collected in the Dean-Stark trap. This material was then worked up with NaHCO$_3$ (25 g) and 3.5 g water followed by 21 g MgSO$_4$. Once all gas evolution had ceased, the solution was passed through silica gel and the toluene was removed by rotary evaporation, affording the product (Compound 4) (39.8 g, 96% yield).

While this invention has been described with respect to these specific examples, it should be clear that other modifications and variations would be possible without departing from the spirit of this invention.

Synthesis of Compound 4

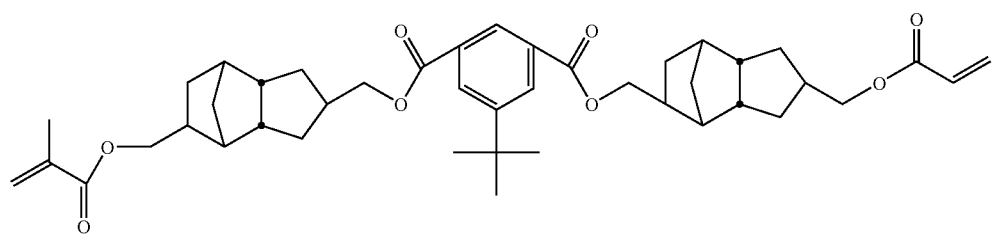

What is claimed is:
1. A composition for molding electronic components, comprising at least one crosslinkable polyester compound selected from the group consisting of:
Compound 1
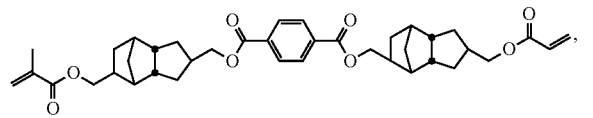
Compound 2
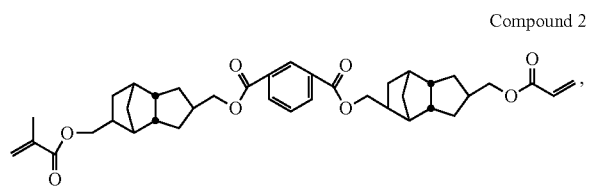
Compound 3
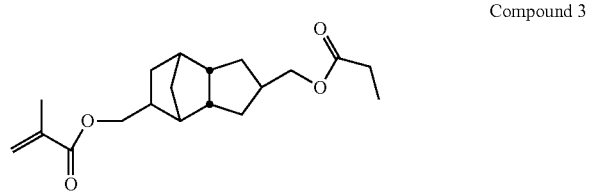
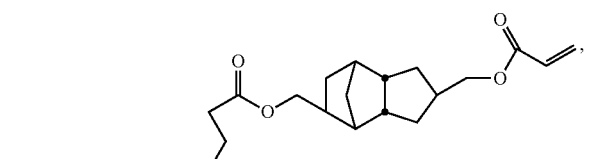
Compound 4
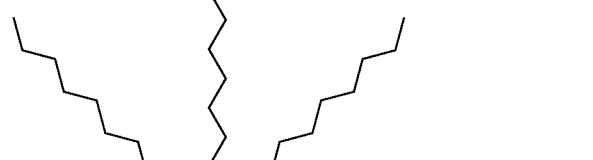
Compound 5
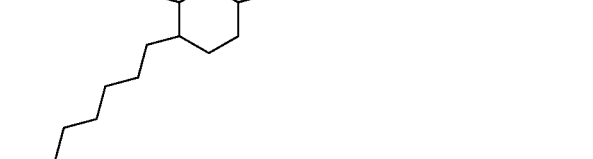
-continued
Compound 6
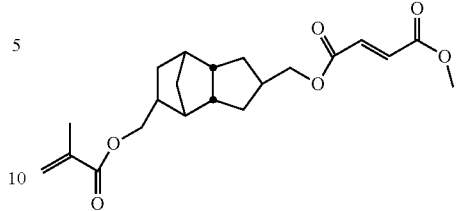
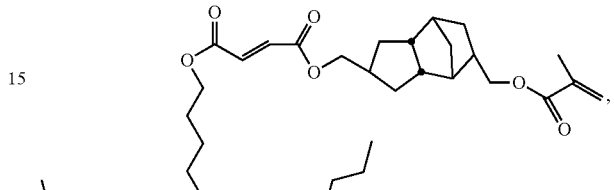
Compound 7
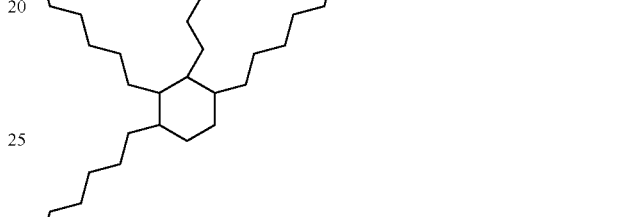
Compound 8
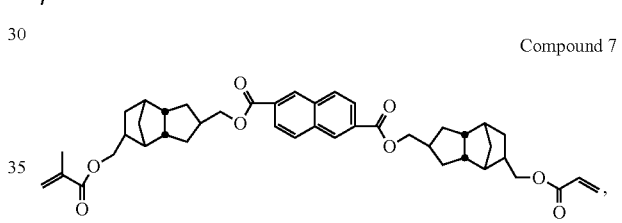
Compound 9
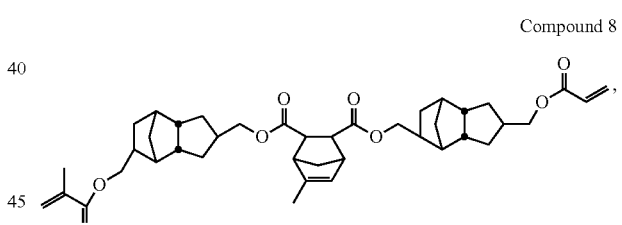
Compound 10
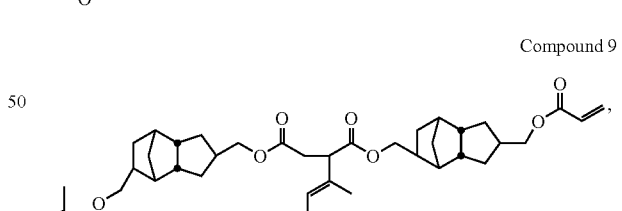

Compound 11
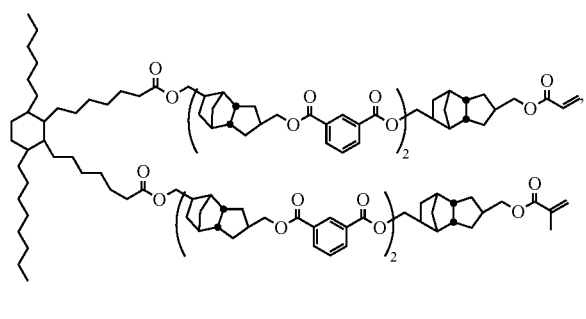
Compound 12
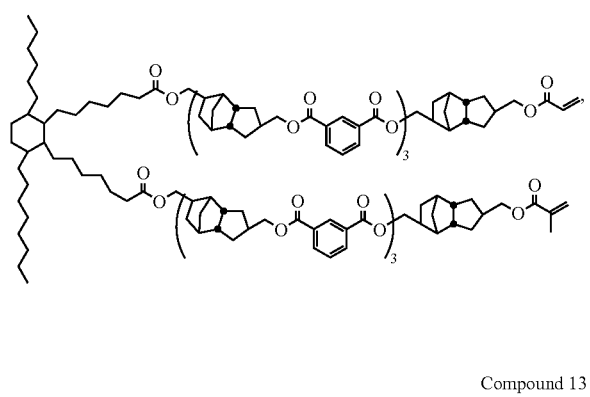
Compound 13
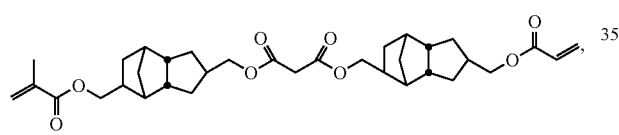
Compound 14
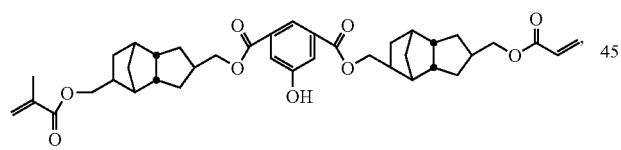
Compound 15
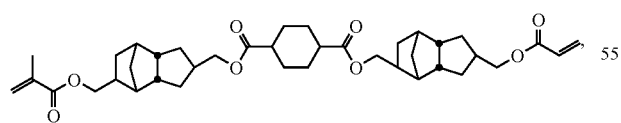
Compound 16
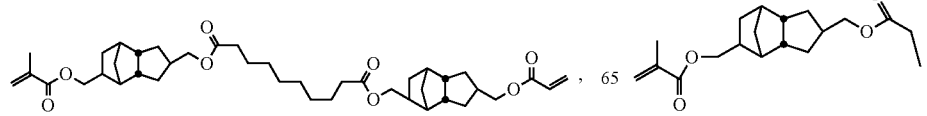
Compound 17
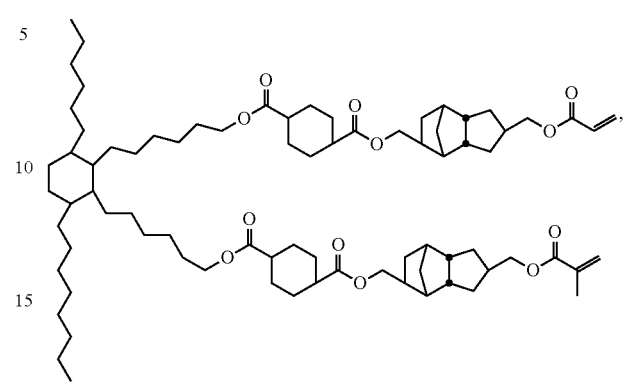
Compound 18
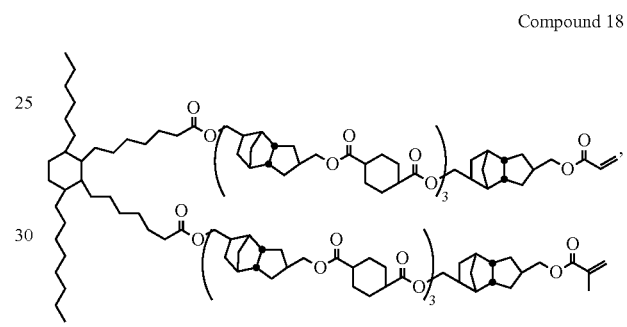
Compound 19
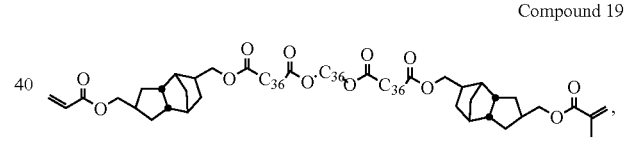
Compound 20
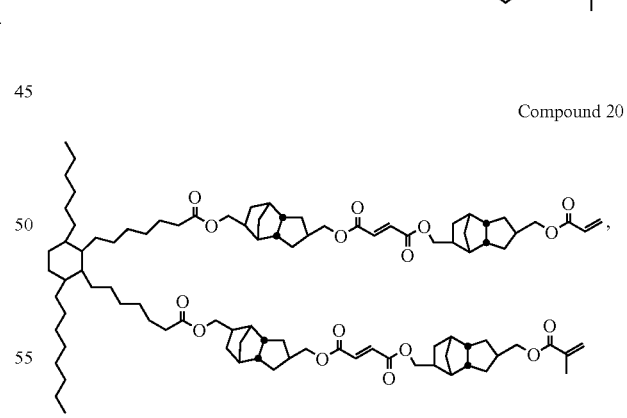
Compound 21
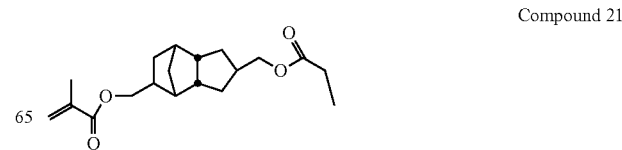

-continued

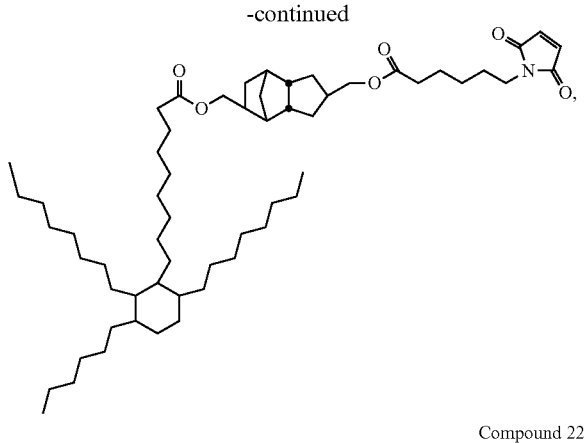

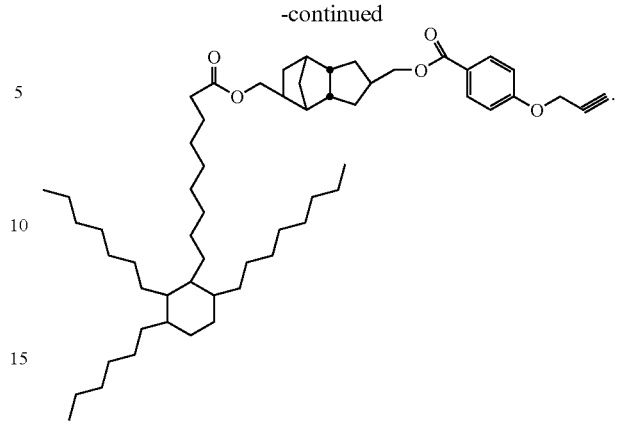

Compound 22

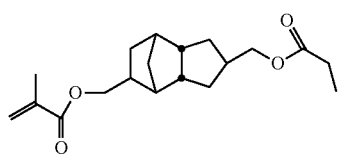

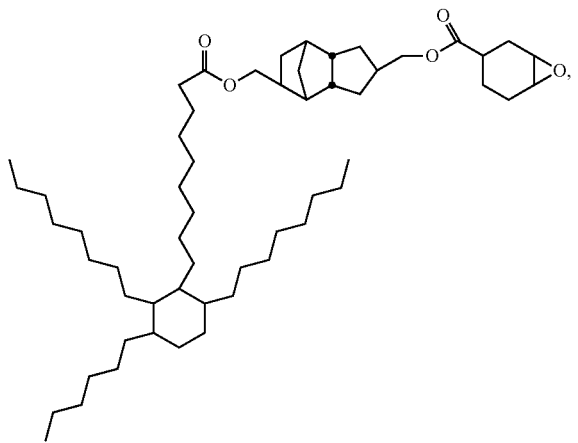

Compound 23

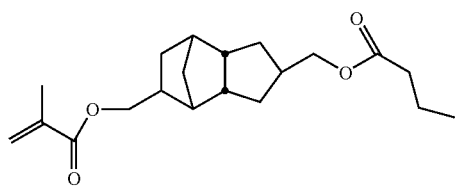

2. The composition of claim 1, further comprising at least one curing initiator.

3. The adhesive composition of claim 2, wherein the curing initiator comprises a free-radical initiator or a photoinitiator.

4. The composition of claim 1, further comprising a compound selected from acrylates, methacrylates, maleimides, vinyl ethers, vinyl esters, styrenic compounds or allyl functional compounds.

5. The composition of claim 1, wherein the crosslinkable polyester compound comprises between about 1 wt % and about 99 wt % of the total composition.

6. The composition of claim 1, wherein the crosslinkable polyester compound comprises between about 10 wt % and about 90 wt % of the total composition.

7. The composition of claim 1, wherein the crosslinkable polyester compound comprises between about 25 wt % and about 75 wt % of the total composition.

8. The composition of claim 1, wherein the crosslinkable polyester compound comprises between about 40 wt % and about 60 wt % of the total composition.

9. The composition of claim 1, further comprising a filler.

10. The composition of claim 9, wherein the filler is thermally conductive.

11. The composition of claim 9, wherein the filler is selected from the group consisting of aluminum nitride, silicon carbide, boron nitride, diamond dust, alumina, polysiloxanes, silica, calcium carbonate, fumed silica, alumina, and titania.

* * * * *